United States Patent [19]
Keil et al.

[11] 3,880,309
[45] Apr. 29, 1975

[54] FIXTURES FOR UNLOADING AXIALLY ALIGNED COMPONENTS

[75] Inventors: O'Dell F. Keil, Phoenix; Milan L. Lincoln, Scottsdale, both of Ariz.

[73] Assignee: Motorola, Inc., Chicago, Ill.

[22] Filed: May 3, 1974

[21] Appl. No.: 466,573

[52] U.S. Cl. ............................... 214/310; 209/126
[51] Int. Cl. ........................................... B65g 65/04
[58] Field of Search ............. 53/148; 209/122, 126; 214/1 R, 1 P, 1 B, 300, 309, 310

[56] References Cited
UNITED STATES PATENTS

| | | | |
|---|---|---|---|
| 3,308,947 | 3/1967 | Dundam | 209/126 |
| 3,426,922 | 2/1969 | Massey | 214/310 |
| 3,823,812 | 7/1974 | Sievrin | 214/1 P |

*Primary Examiner*—Robert J. Spar
*Assistant Examiner*—Lawrence J. Oresky
*Attorney, Agent, or Firm*—Vincent J. Rauner; Kenneth R. Stevens

[57] ABSTRACT

This invention provides apparatus or fixtures for transferring a plurality of items, for example, axial lead components, from a processing rack in which the items are located in a first predetermined spacing density to a second support or processing apparatus requiring a lesser spacing density. First and second nestable frame members each having open portions are capable of receiving the first support member for unloading a first group of alternate items into V-shaped grooves disposed on the first frame member and unloading a second group of alternate items onto V-shaped grooves disposed on the second frame member. The support surface of the V-shaped grooves on both the first and second frame member are spaced apart at the second spacing density. The second frame member is then employed to batch load a processing apparatus, a mold frame in the preferred embodiment, requiring the axial lead devices or components to be spaced apart at the second spacing density.

9 Claims, 2 Drawing Figures

FIXTURES FOR UNLOADING AXIALLY ALIGNED COMPONENTS

BACKGROUND OF THE INVENTION

1. Field of the Invention

This invention relates to an unloading fixture, and more particularly to an unloading fixture for transferring axial lead devices or components.

2. Discussion of the Prior Art

During processing of components, for example, axial lead high voltage rectifiers, capacitors, etc., numerous operations such as cleaning, baking, spraying and coating are performed in a batch mode. During these batch processing procedures the components are carried on a work rack, and for maximum efficiency and economy are disposed to utilize the maximum density spacing.

Some end of the line process steps require a component spacing density different than that employed for the earlier process steps at the front of the line. For example, in the electronic device field it is often necessary to mold a high dielectric constant material around the devices. For the molding operation or any operation which requires a lower spacing density, the items must be spaced further apart for batch processing. Efficient economical means of batch unloading a plurality of components or items disposed at a first spacing density onto another support member requiring a lesser spacing density has not been available.

It has been suggested to employ unloading racks having receiving grooves which are disposed at the ultimate desired spacing density. However, these structural schemes do not solve the problem in the most efficient and economical manner in that they often require the unloading racks to be disposed in a predetermined orientation with respect to each other in order to insure that all the items are unloaded from the initial carrying or holding rack during successive loading sequences.

SUMMARY OF THE INVENTION

It is therefore an object of the present invention to provide apparatus for economically and efficiently transferring a plurality of items spaced apart at a first spacing density to another support member at a second spacing density lesser than the first spacing density.

Another object of the present invention is to provide a transferring and spacing mechanism for loading objects into an ultimate work support member wherein the transferring apparatus does not require unique orientation between its relatively movable members during the transfer operation.

Another object of the present invention is to provide an economical and efficient apparatus for transferring axial lead components to a mold station which reduces the required number of transfer members or racks.

Another object of the present invention is to provide transfer apparatus for unloading spaced items disposed at a first spacing density to a work member, mold in the preferred embodiment, at a second spacing density. Within the fullest application of the invention the second spacing density maybe larger or smaller than the first spacing density.

In accordance with the aforementioned objects, the present invention provides a first frame member having a plurality of V-shaped recesses disposed in rows oppositely spaced and located at opposite sides of its open portion. A second frame member also having an open portion is capable of nesting within the first member and also comprises an open portion and a plurality of V-shaped recesses disposed in a pair of rows located at opposite sides of its open portion. The plurality of V-shaped recesses associated with the second member have an upper open dimension equal to or greater than the adjacent spacing dimension of items to be unloaded and transferred. Also, the nadir or lowermost surface of the V-shaped grooves associated with the second frame member is located below the lowermost or nadir surface of the V-shaped grooves associated with the first frame member in order that the second frame member can be disposed within the first frame member in any orientation and be capable of ultimately transferring any group of alternate items from the initial carrier to be unloaded.

DESCRIPTION OF THE PREFERRED EMBODIMENTS

Figure 1:
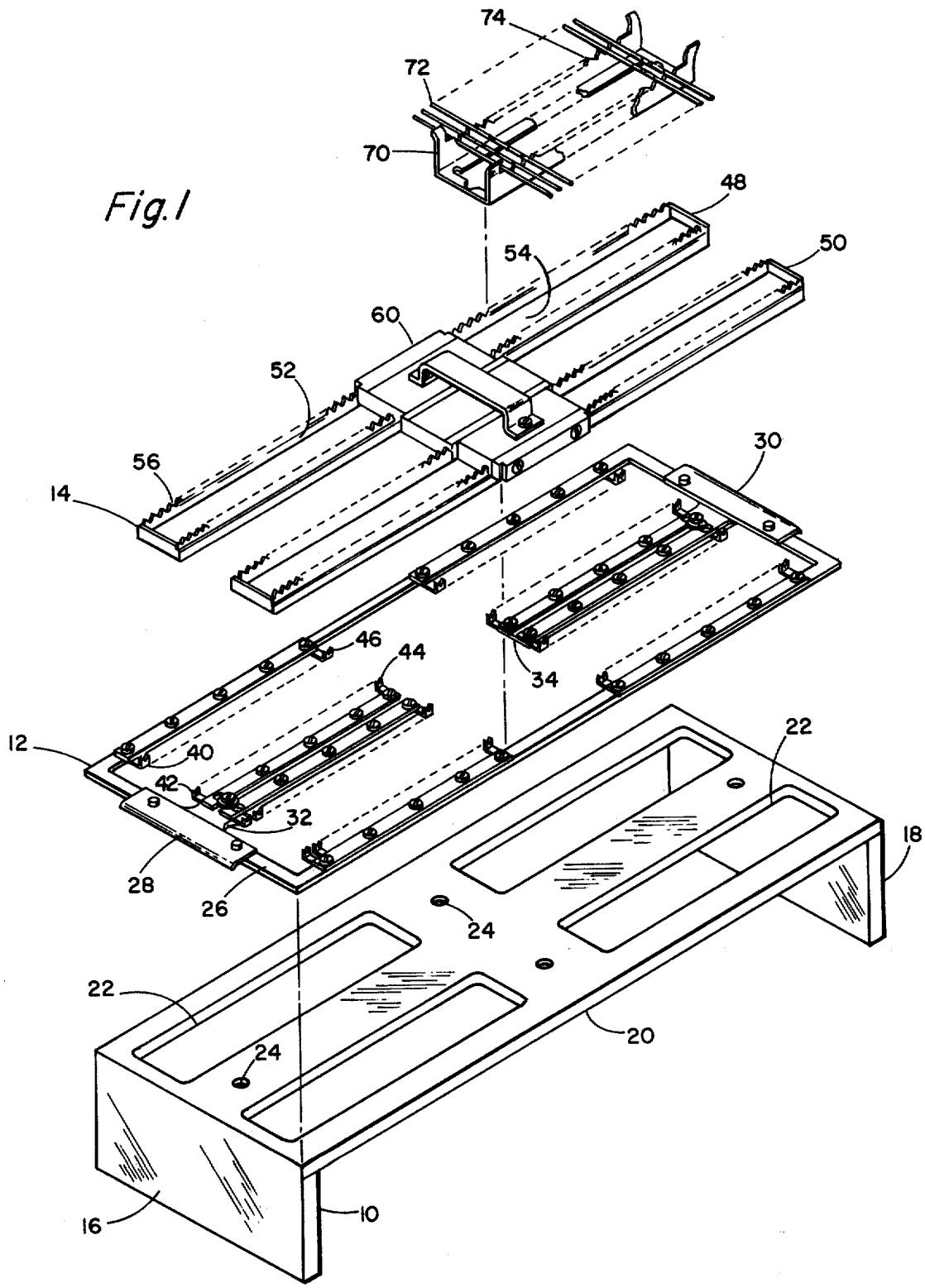
FIG. 1 is an exploded partial perspective view illustrating the unloading and the transfer apparatus.

Now referring to FIG. 1, it illustrates an exploded partial perspective showing the unloading and transfer apparatus in the preferred embodiment of the present invention. A base member 10 is adapted to receive an unload fixture 12 and an unload and reload fixture 14. The base 10 includes a pair of support legs 16 and 18 for mounting a horizontal platform 20. The platform 20 contains a plurality of symmetrically disposed openings, for example, 22 and a plurality of alignment holes generally shown at 24 for positioning fixture 12.

The load fixture 12 comprises an outer frame member 26 having a pair of handles 28 and 30 for facilitating loading into the base member 18. A pair of cantilevered arms 32 and 34 are centrally disposed within the frame member 26 and secured by any suitable means. Within the spirit of the present invention the fixtures are designable to handle a greater number of items if desired.

A plurality of V-shaped recesses are carried by the fixture 12 and are disposed in oppositely spaced rows, four of which are shown at 40, 42, 44, and 46 with the rest being shown in phantom. These designated V-shaped recesses constitute a first pair of oppositely spaced rows. For purposes of simplicity, the other support disposed on the unloading and loading fixture 12 have not been specifically identified and merely extend the unloading and loading capacity.

The other unloading and reloading fixture 14 comprises a pair of frame members 48 and 50. Each of the frame members 48 and 50 contain a plurality of openings 52, 54, etc. Disposed at the periphery of each of the openings in opposite spaced rows are a plurality of V-shaped recesses generally designated at 56. A central handle portion 60 allows the fixture 14 to be readily lifted into and out of its nesting position with respect to the fixture 12 and base member 10. That is, the central handle portion 60 and members 48 and 50 form an H shape dimensioned such that they fit within the respective opening portions of fixture 12.

A U-shaped channel carrier member 70 also contains a plurality of V-shaped recesses for supporting a plurality of V-shaped recesses for supporting a plurality of axial lead components generally shown at 72 in a plurality of V-shaped grooves 74. The carrier 70 is dimensioned such that during unloading it will readily pass through the respective openings in the base member 10 and the fixtures 12 and 14.

Figure 2:
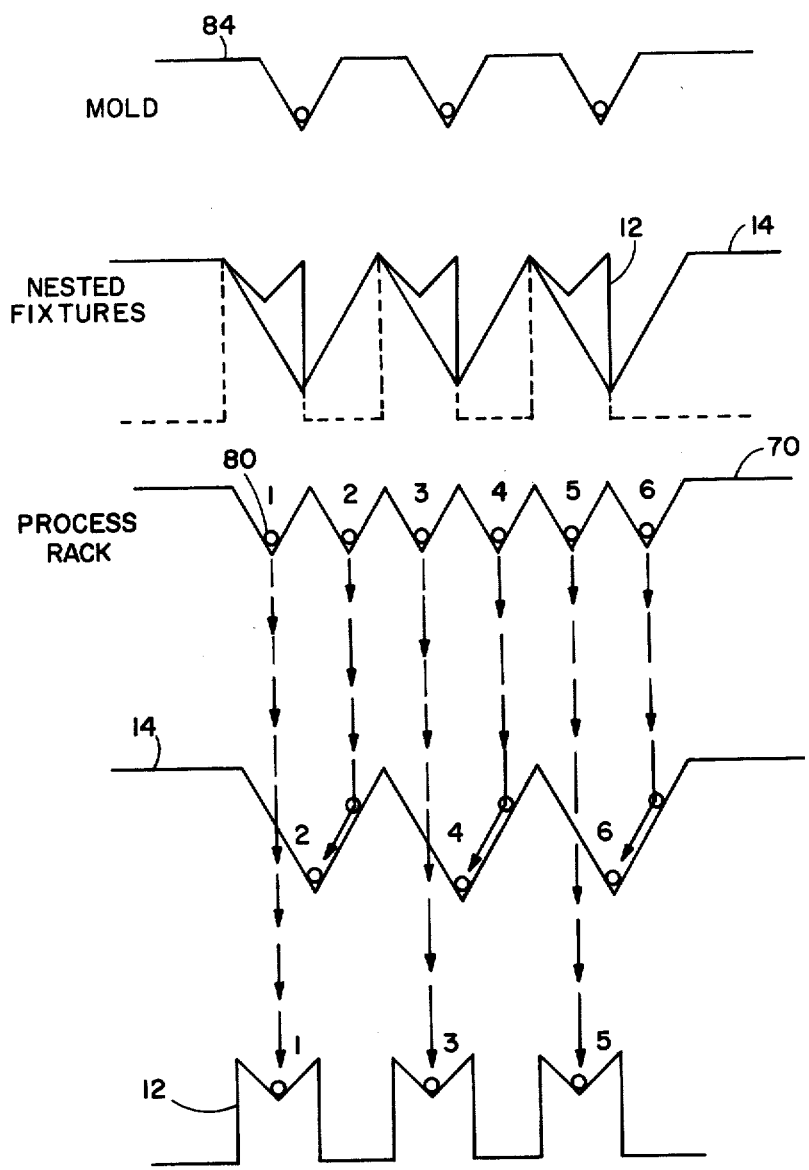
FIG. 2 is a schematic diagram illustrating the relative juxtaposition of the transfer members and the loading and unloading of the items from the initial carrier to the ultimate work member.

Now referring to FIG. 2, it illustrates in schematic form the loading and unloading of the plurality of components from a first carrier having a predetermined spacing density to an ultimate work piece or mold having a second predetermined spacing density less than the first spacing density. Like reference numerals are employed to designate corresponding structure of FIG. 1 and its equivalent schematic representations of FIG. 2. A plurality of components 80 are carried by the process rack 70. Again, the process rack 70 contains a plurality of V-shaped recesses which are effective to space the components 80 apart from each other at a first predetermined spacing density and transfer them to a mold support assembly schematically depicted at 84 and having a second predetermined spacing density requirement, which in the preferred embodiment is one-half that of the spacing density for the process rack 70. The next to uppermost schematic diagram illustrates the nested juxtaposition of the unload fixture 12 and the unload and reload fixture 14 in a supporting relationship with base 10. For clarity of explanation, the fixtures 12 and 14 are also shown separated in the bottom two sequences of FIG. 2 for more readily illustrating the unload operation.

Accordingly, when the process rack or first carrier member 70 is dropped through the openings in the fixtures 12 and 14, the first, third, fifth, etc., or a first alternate group of devices 80 from the rack 70 are deposited or unload onto the fixture 12. Similarly, the second, fourth, sixth, etc., components 80 on the process rack 70 are unload onto the fixture 14. The unloading of the plurality of alternate items from the process rack 70 onto the fixtures 12 and 14 is schematically represented by the direction of arrows.

After the initial unload of the plurality component from the tray 70, only one of which is shown in FIG. 1, the fixture 12 is lifted off of the base support 10 and set to one side. This allows access to the unload tray or fixture 14 without upsetting the components stored in the fixture 14, as it is seen from the second sequence of drawings in FIG. 2 that the fixture 12 components are unloaded to a position located above the components of fixture 14.

With fixture 12 removed, the handle 60 can be utilized to remove fixture 14 and employ it as a reload member for a mold rack or work member depicted at 84. The emptied fixture 14 is then deposited back onto the base member 10 and fixture 12 nested over it.

During the second unload sequence fixture 14 is upwardly removed so as to unload the first, third, fifth, etc., components from the fixture 12. Accordingly, the apparatus of the present invention in two very simple and economical steps is capable of fully unloading the components initially carried by a rack or tray 70 spaced at a first predetermined density and reloading them into an ultimate mold or work object 84 at a predetermined second spacing density less than the first predetermined spacing density.

Significantly, the fixture 40 can be nested with fixture 12 in any orientation, that is, no bias is required, and it is insured that all components are completely unloaded and transferred to the mold or ultimate work support member having the same or another set of centers.

The apparatus of the present invention can be fabricated from any suitable material which is compatible with the process variables involved.

While the invention has been particularly shown and described in reference to the preferred embodiments thereof, it will be understood by those skilled in the art that changes in form and details may be made therein without departing from the spirit and scope of the invention.

What is claimed is:

1. Apparatus for transferring a plurality of items located on a first support means and being spaced apart a first predetermined distance, the predetermined distances constituting a first spacing density, to a second support member at a predetermined spacing density, comprising:
  a. a first frame member having an open portion and supporting a first plurality of recesses, said plurality of recesses being disposed in a pair of rows oppositely spaced and located at opposite sides of the open portion, each of said first plurality of recesses having a nadir support surface spaced apart at a second spacing density;
  b. a second frame member having an open portion and being adaptable for nesting in a nested position within the first member and also having an open portion, said second frame member including a second plurality of recesses disposed in a pair of rows oppositely spaced and located at opposite sides of its open portion, each of said second plurality of recesses having a nadir support surface spaced apart at said second spacing density, and each of said second plurality of recesses having an upper opening dimension equal to or greater than the first predetermined distance; and
  c. means for positioning said second frame member within said first frame member in said nested position in a fixed relationship for locating said nadir support surfaces of second plurality of recesses below the nadir surfaces of said first plurality of recesses, and
  d. the openings associated with the first and second frame members being capable of receiving the first support means carrying a plurality of items for unloading a first group of alternate items onto the first frame member and a second group of alternate items onto the second frame member, the second frame member being employed to load a second support member requiring items to be spaced at said predetermined spacing density when said first frame member is lifted to a position completely above said second frame member.

2. Apparatus for transferring a plurality of items located on a first support means and being spaced apart a first predetermined distance, the predetermined distances constituting a first spacing density, to a second support member at a predetermined spacing density, as in claim 1 wherein:
  a. said second spacing density associated with said first and second recesses is uniform and is less than the first spacing density.

3. Apparatus for transferring a plurality of items located on a first support means and being spaced apart a first predetermined distance, the predetermined distances constituting a first spacing density, to a second support member at a predetermined spacing density, as in claim 1 wherein:
 a. said first and second plurality of recesses are constituted by a plurality of first and second V-shaped slots, respectively.

4. Apparatus for transferring a plurality of items located on a first support means and being spaced apart a first predetermined distance, the predetermined distances constituting a first spacing density, to a second support member at a predetermined spacing density, as in claim 3 wherein:
 a. said means for positioning comprises a base support member having an open portion; and
 b. said open portions associated with said first member, second member, and said base support member being symmetrically disposed with respect to each other to provide a continuous opening for allowing the first support means to be slideably passed therethrough in order to unload said plurality of items onto said first and second V-shaped slots.

5. Apparatus for transferring a plurality of items located on a first support means and being spaced apart a first predetermined distance, the predetermined distances constituting a first spacing density, to a second support member at a predetermined spacing density, as in claim 14 wherein:
 a. said second frame member includes handle means for facilitating removal for unloading to a second support member at said predetermined spacing density, less than said first spacing density.

6. Apparatus for transferring a plurality of items located on a first support means and being spaced apart a first predetermined distance, the predetermined distances constituting a first spacing density, to a second support member at a predetermined spacing density, as in claim 5 wherein:
 a. said items are constituted by a plurality of axial lead components.

7. Apparatus for transferring a plurality of items located on a first support means and being spaced apart a first predetermined distance, the predetermined distances constituting a first spacing density, to a second support member at a predetermined spacing density, as in claim 6 wherein:
 a. said first support means comprises a processing rack means for supporting said plurality of axial lead components during initial batch processing.

8. Apparatus for transferring a plurality of items located on a first support means and being spaced apart a first predetermined distance, the predetermined distances constituting a first spacing density, to a second support member at a predetermined spacing density, as in claim 7 wherein:
 a. said second support member comprises a mold load member having recesses disposed apart at said uniform predetermined spacing density for supporting the plurality of axial lead components during a batch molding process for separately encapsulating each of said axial lead components.

9. Apparatus for transferring a plurality of items located on a first support means and being spaced apart a first predetermined distance, the predetermined distances constituting a first spacing density, to a second support member at a predetermined spacing density, as in claim 8 wherein:
 a. said axial lead components comprise high voltage rectifiers.

* * * * *